UNITED STATES PATENT OFFICE.

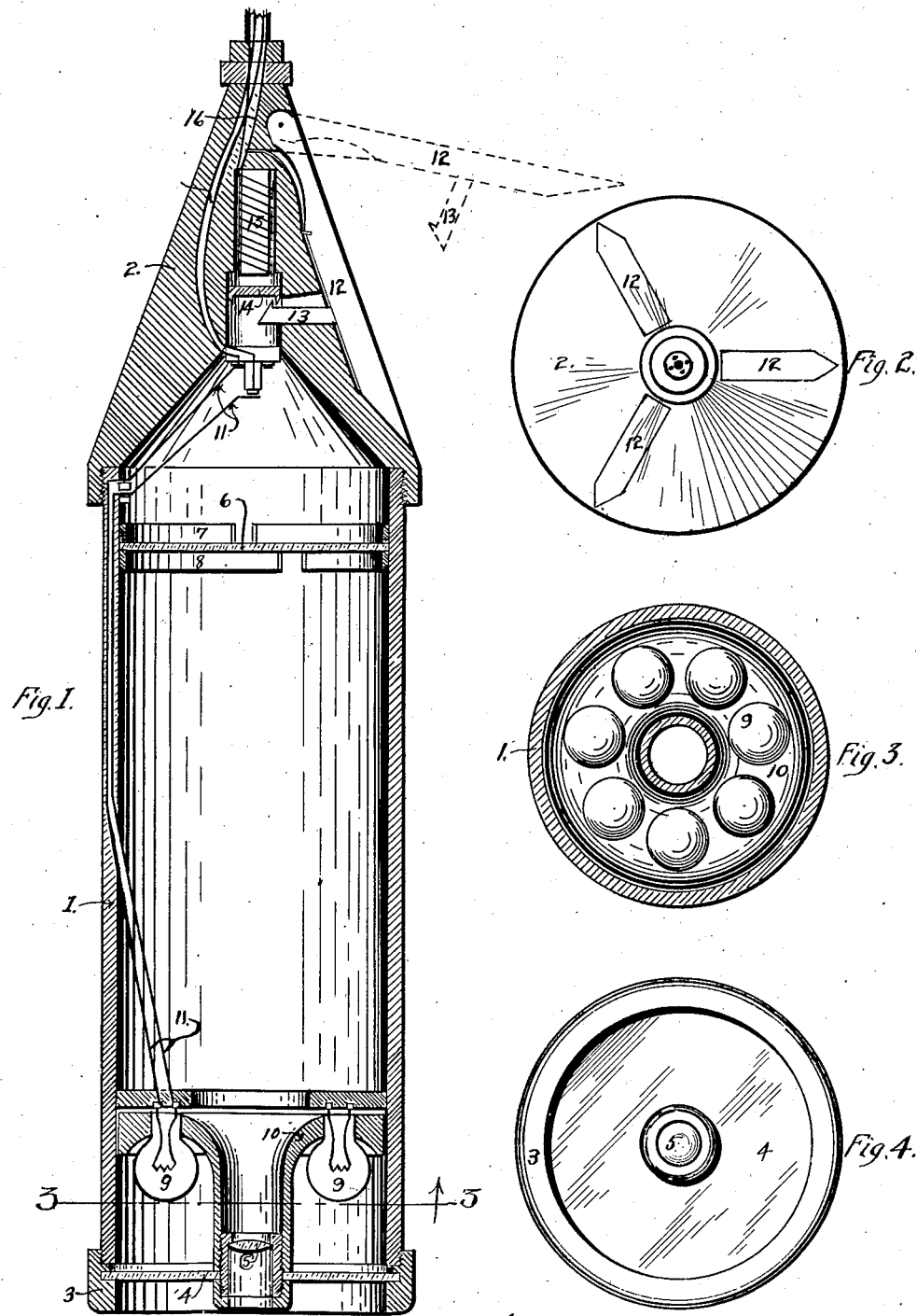

JOHN B. DILTS, OF PAUL, IDAHO.

SUBTERRANEAN CAMERA.

1,331,627.  Specification of Letters Patent.  Patented Feb. 24, 1920.

Application filed February 23, 1918. Serial No. 218,916.

*To all whom it may concern:*

Be it known that I, JOHN B. DILTS, a citizen of the United States of America, residing at Paul, in the county of Minidoka, State of Idaho, have invented a new and useful Subterranean Camera, of which the following is a specification.

My invention relates to a subterranean camera, useful in under-water or underground photography, more especially useful in drilled wells, and my invention has for its objects, first, to provide an improved apparatus by means of which objects such as lost tools and steel in a drilled well, either above or below water, may be clearly photographed and their positions and conditions accurately determined, second, to enable photographs to be taken of the earth and rock formations in drilled wells, third, to provide an improved apparatus of this class which may be made stationary at any desired depth in a well.

I attain these objects by mechanism illustrated in the accompanying drawing, in which;

Figure 1 is a longitudinal section. Fig. 2 is a top plan view. Fig. 3 is a cross section on a line identified on the drawing as 3—3. Fig. 4 is a bottom plan view.

Similar numerals refer to similar parts through the several views.

Going into detail with reference to the drawing, 1, is a cylinder, which may be made of brass, bronze or nickel, threaded at both ends and closed with caps, 2, and 3, respectively, cap 3 being fitted with and containing a transparent glass window 4, and lens 5, in such manner as to throw image on sensitized dry plate 6, which said plate 6 is adjustably held in place by means of open expanding rings 7 and 8. The standard size of the cylinder is four inches in diameter, though a larger or smaller size may be made depending upon conditions in practice. Illumination sufficient for the taking of photographs under-water or under-ground is furnished by means of incandescent electric lights 9 fitted and set in reflector 10, there being seven lights of thirty-six candle power each in a camera having a diameter of three inches, twelve lights in a camera having a diameter of four inches, in other words a light to every inch of the circumference, the said lights 9, being lighted by means of an electric current passed through wires 11, and to these wires by means of line wires from the surface of the well.

Cap 2 contains mechanism for operating legs 12, the operation of which legs is by means of an electric current passing through wires 16, from line wires from the surface of the well, which current energizes electromagnet 15 thereby attracting and raising armature and trigger 14, which releases dogs 13, thereby releasing spring legs 12 and causing same to engage sides of well or shaft in which it is desired to operate the camera and thus holding camera stationary and fixed for the taking of photographs.

The camera is lowered into a well or shaft to the desired depth by means of ropes or cable, the electric current controlling the legs is turned on and the camera made stationary and steady, this current is then turned off, then the current to the lights, which furnish the illumination is turned on; after exposure this current is turned off and the camera may be withdrawn from the well or shaft.

Having described my invention, what I claim is—

1. A camera of the class described comprising a cylinder one end of which is closed by a cap carrying means by which the cylinder may be supported, a closure for the opposite end of the cylinder and provided with an electric lamp and a reflector therefor arranged to project light from said cylinder, a lens at the last named end of said cylinder arranged to form an image therein, means for supporting a sensitized element in said cylinder in the focal plane of said lens, and means for conducting current to said lamp.

2. A camera of the class described comprising a cylinder one end of which is closed by a cap carrying means by which the cylinder may be supported, a closure for the opposite end of the cylinder and provided with an electric lamp and a reflector therefor arranged to project light from said cylinder, said closure having a tubular central portion, a lens in said portion arranged to form an image in the cylinder, means for supporting a sensitized element in said cylinder in the focal plane of said lens and means for conducting current to said lamp.

3. A camera of the class described comprising a cylinder one end of which is closed by a cap carrying means by which the cylinder may be supported, a closure for the opposite end of the cylinder and provided with an electric lamp and a reflector therefor arranged to project light from said cylinder, said closure having a central tubular portion, a transparent plate located at the adjacent end of the cylinder and extending between the inner wall thereof and the tubular portion and covering the electric lamp and reflector, a lens in said tubular portion arranged to form an image in the cylinder, means for supporting a sensitized element in said cylinder in the focal plane of said lens and means for conducting current to said lamp.

4. A camera of the class described comprising a cylinder, a closure for one end of the cylinder, a lens carried by said closure and arranged to form an image in the cylinder, means for supporting a sensitized element in said cylinder in the focal plane of said lens, a cap closing the other end of the cylinder, spring legs carried by said cap, a trigger for holding said legs in closed position against the tension of the springs, magnetic means for releasing the trigger and means for conducting current to said magnetic means to energize the same to release the trigger.

JOHN B. DILTS.